Nov. 13, 1923.  1,473,667

A. W. BURKS

COMBINED FOOT VALVE AND STRAINER

Filed March 14, 1922

Inventor:
Arthur W. Burks,
By Cushman, Byrnes & Warby
Att'ys.

Patented Nov. 13, 1923.

1,473,667

UNITED STATES PATENT OFFICE.

ARTHUR W. BURKS, OF DECATUR, ILLINOIS.

COMBINED FOOT VALVE AND STRAINER.

Application filed March 14, 1922. Serial No. 543,560.

*To all whom it may concern:*

Be it known that I, ARTHUR W. BURKS, a citizen of the United States, residing at Decatur, in the county of Macon and State of Illinois, have invented new and useful Improvements in Combined Foot Valves and Strainers, of which the following is a specification.

This invention relates to water distribution and has as its object the provision of a combined foot valve and strainer intended primarily for use in connection with pumps, although, of course, is not restricted to this use.

An object of the invention is to provide a combined valve and strainer which may be used in pipes of small diameter by reason of the fact that the structure has a small diameter, and at the same time a fluid passage with as large an area as the ordinary valve and strainer of much larger cross sectional dimension.

Another object of the invention is to provide a construction in which the valve casing and strainer may be readily disassociated to permit a thorough cleaning of the strainer, and, if desirable, to clean the valve and its seat, which, preferably, are removable.

A still further object of the invention is to provide a valve construction which is positive and efficient in its operation, and will, at all times, tightly fit upon its seat so as to prevent leakage.

Other objects of the invention, such as simplicity and rigidity of construction and economy in manufacture will become more clear as the description proceeds in connection with the embodiment of invention disclosed in the accompanying drawings, in which—

Figure 1:
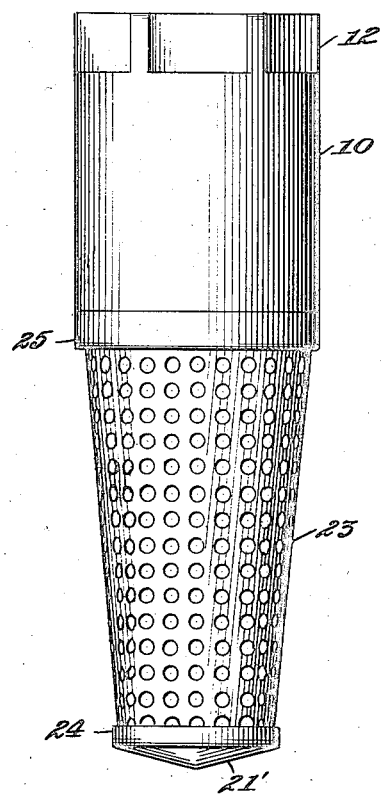
Figure 2:
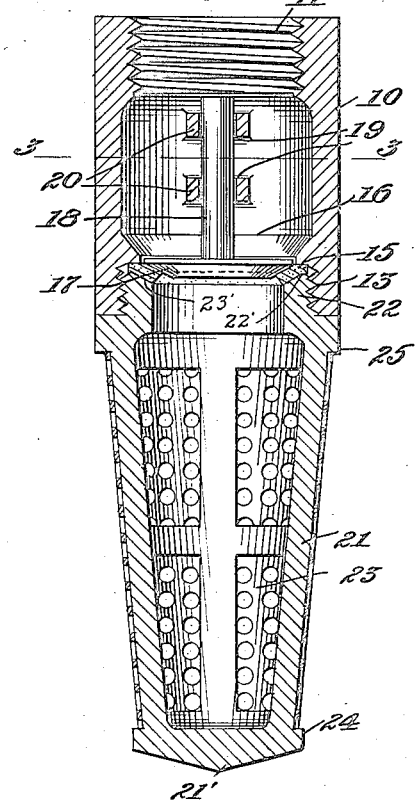

Figure 1 is an elevational view,

Figure 2 a longitudinal sectional view, and

Figure 3:
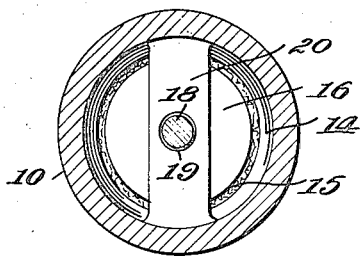

Figure 3 a cross section on the line 3—3 of Fig. 2.

Referring to the drawings for a more detailed description, 10 indicates a valve casing of tubular construction adapted to be attached to a pipe which may be in communication with a pump. For this purpose the casing is provided with suitable connecting means, such as internal threading 11, and its upper end is of hexagonal shape, as indicated at 12, to receive a wrench. The opposite end of the casing to which the strainer is to be connected is also preferably internally threaded, as at 13, and adjacent the thread is formed a valve seat abutting the means, such as the shoulder or flange 14. A valve seat 15 of leather, rubber or other suitable material, abuts the shoulder and a valve 16 is adapted to rest upon this seat. The valve has a spherical seating surface 17 and a stem 18 extending upwardly through aligned openings 19 in valve guiding cross arms or bars 20 spaced longitudinally of the casing. The valve stem fits somewhat loosely through these openings, so that there is no danger of the valve stem binding and preventing movement of the valve to or from the seat. The spherical seating surface of the valve at all times ensures tight engagement of the valve with its seat, even though due to the slight lateral play of the valve and stem the valve should not at times be exactly centered upon its seat. By reason of the provision of two cross bars the lateral play of the valve stem is limited and the spacing of the guide bars minimizes the danger of binding of the stem in its guides.

The strainer comprises a frame 21 closed at its lower end 21' and having a grid-like side construction so that there is ensured through the strainer a water passage area as large as the passage in the pipe to which the valve and strainer are connected. The frame has an externally threaded reduced nipple portion 22 extending into the valve casing and cooperating with the threading therein to maintain the strainer frame in association with the valve casing. It will be observed that the end of the nipple tightly fits against the valve seat and performs the additional function of maintaining the valve seat tightly against the shoulder 14. It should be noted that the edge of the nipple which engages the valve seat has a relatively sharp seat engaging surface 22' which binds the seat along a line spaced from the outer and inner peripheral edge of the seat, thus avoiding wrinkling of the seat, which would occur were the clamping surface flat. Moreover the interior of the nipple below the seat has an outwardly flared portion 23' which supports the seat, while at the same time permitting the seat to conform to the spherical surface 17 of the valve. The seat, and also the top surface of the shoulder, are inclined at a relatively sharp angle to the wall of the nipple, thereby eliminating all pockets or supporting ledges for sand and other foreign material which tend to prevent the valve from properly engaging its seat.

By reference to Fig. 2 it will be noted that the area of the passageway within the valve casing adjacent the valve seat is considerably reduced by the nipple 22, the valve seat and the shoulder 14; and this serves to increase the velocity of the water, which is particularly desirable in a valve of this type for the reason that there is a tendency for dirt and other foreign matter to collect around the valve seat. By increasing the velocity of the water any foreign matter tending to collect around the seat is carried away. As an additional safeguard, the upper surface of the shoulder 14 is inclined with respect to the wall of the casing, and also, the upper edge of the nipple is beveled, thus eliminating all surfaces extending in a plane at right angles to the wall of the casing which naturally tend to support dirt and like matter which would prevent the valve from properly engaging its seat.

The strainer frame is enclosed by a screening structure 23, which is held in position against movement longitudinally of the frame by a shoulder 24 at the lower end of the frame, and a shoulder 25 at the upper end thereof.

It will be observed that at no point is the construction of larger outside dimensions than the cross sectional diameter of the valve casing by reason of the threaded connection of the strainer with the valve casing; this permits the insertion of the device within pipes of small diameter, and, at the same time, affords a fluid passage-way with an area as large as that of the pipe to which the valve casing is connected.

When the valve is to be cleaned or the structure disassembled for any other purpose, it is simply necessary to unscrew the strainer frame from the valve casing and this permits the removal of the valve seat and the valve. Particular emphasis is laid upon the construction of the valve with its spherical seating surface, since this valve construction is of particular advantage in a foot valve, wherein there must necessarily be provided some lateral play for the valve and stem in order to prevent binding of the stem in its guides. In the present construction this lateral play is afforded and an exact centering of the valve upon the seat is not necessary in order to ensure a tight engagement with the valve of its seat.

It being understood that such modifications may be made in the illustrated and described construction as come within the scope of the invention, what I claim is:

I claim:—

1. A combined foot valve and strainer comprising a tubular valve casing, a shoulder in said casing, a removable valve seat abutting said shoulder, a valve within said casing, a cross arm within said casing provided with an opening therein, a valve stem extending through said opening, the cross arm serving as a guide for said stem and valve, internal threading adjacent one end of said casing, a strainer frame provided with a plurality of openings and having a threaded portion extending into said valve casing cooperating with the threading within said casing and serving both to maintain the valve seat against said shoulder and to hold the strainer in association with said casing, and a foraminous screening element on said frame.

2. A combined foot valve and strainer comprising a tubular valve casing, internal threading at each end of said casing, a pair of cross bars in said casing spaced longitudinally thereof, said cross bars having aligned central openings therein, a valve in said casing having a stem extending through said openings, a removable valve seat in said casing, an internal shoulder in said casing against which said seat abuts, a strainer frame having a threaded portion extending into the end of the casing adjacent said shoulder serving both to maintain the seat in position tightly against said shoulder and to hold the strainer in association with the valve casing, and a foraminous screening structure covering said frame.

3. A combined foot valve and strainer comprising a tubular valve casing, internal threading at one end of said casing, an internal shoulder adjacent said threading, a removable valve seat in said casing fitting against said shoulder, a valve within said casing, and a strainer having a threaded nipple extending into said end of the casing, the edge of said nipple being beveled to provide a relatively sharp valve seat engaging surface, said edge of the nipple engaging the valve seat and serving to hold the valve seat tightly against said shoulder.

4. A combined foot valve and strainer comprising a tubular valve casing, a shoulder in said casing, internal threading at one end of the casing adjacent said shoulder, a removable valve seat in said casing fitting against said shoulder, a valve within the casing, a strainer having a hollow threaded portion extending into the casing and serving to clamp said seat against the shoulder, the edge of said strainer portion being beveled to provide a relatively narrow seat engaging surface, and the interior of said strainer portion below the seat being flared outwardly to afford a support for the valve seat.

5. A combined foot valve and strainer comprising a tubular valve casing, a shoulder in said casing, internal threading at one end of the casing adjacent said shoulder, a removable relatively yielding valve seat in said casing fitting against said shoulder, a valve within the casing, a strainer having a hollow threaded portion extending into the casing and serving to clamp said seat against the shoulder, the edge of said strainer portion being beveled to provide a relatively narrow valve seat engaging surface, and the interior of said strainer portion below the seat being flared outwardly to afford a support for the valve seat and to permit the seat to assume a position inclined to the wall of the casing.

6. A combined foot valve and strainer comprising a tubular valve casing, a shoulder in said casing, a removable relatively yielding valve seat in the casing fitting against said shoulder, a valve within said casing, a strainer secured to the casing, and a tubular member for clamping said seat against the shoulder, the seat engaging edge of said member being beveled to provide a relatively narrow seat engaging surface.

7. A combined foot valve and strainer comprising a tubular valve casing, a shoulder in said casing, a removable relatively yielding valve seat in the casing fitting against said shoulder, a valve within said casing, a strainer secured to the casing, and a tubular member for clamping said seat against the shoulder, the seat engaging edge of said member being beveled to provide a relatively narrow seat engaging surface, and the interior thereof below the seat being outwardly flared to form a support for the seat permitting the latter to assume a position inclined to the wall of the casing.

In testimony whereof I have hereunto set my hand.

ARTHUR W. BURKS.